United States Patent [19]

LeFevre

[11] Patent Number: 4,905,804
[45] Date of Patent: Mar. 6, 1990

[54] CONTROL LEVERS

[75] Inventor: Patrick B. LeFevre, Just en Chee, France

[73] Assignee: Massey-Ferguson Services N.V., Curacao, Netherlands Antilles

[21] Appl. No.: 102,463

[22] Filed: Sep. 29, 1987

[30] Foreign Application Priority Data

Oct. 3, 1986 [GB] United Kingdom ............... 8623855

[51] Int. Cl.⁴ .............................................. F16D 67/02
[52] U.S. Cl. .............................. 192/12 R; 74/471 XY; 192/12 C; 192/48.5; 192/48.9
[58] Field of Search ................. 192/12 R, 12 C, 82 R, 192/84 R, 48.2, 48.3, 48.5, 48.9; 74/471 XY; 200/61.86, 61.87, 61.88

[56] References Cited

U.S. PATENT DOCUMENTS

| | | | |
|---|---|---|---|
| 3,400,790 | 9/1968 | Ruhl et al. ....................... | 192/0.094 |
| 3,773,156 | 11/1973 | Nyquist ............................ | 192/0.094 |
| 4,004,665 | 1/1977 | Guhl et al. ...................... | 74/471 XY |
| 4,120,374 | 10/1978 | Heisig ............................. | 192/0.094 X |
| 4,513,847 | 4/1987 | Hansen ........................... | 74/471 XY |
| 4,671,395 | 6/1987 | Dobberpuhl et al. ............. | 192/17 C |

FOREIGN PATENT DOCUMENTS 1353917  1/1964  France
2751093  5/1979  Fed. Rep. of Germany Primary Examiner—Rodney H. Bonck

[57] ABSTRACT

A power take-off control lever arrangement in which a single control lever 32 controls an engine speed power take-off clutch C2, a ground speed power take-off clutch C2 and a power take-off brake B. The control lever 32 is movable between positions C1' and B' in which switches 28 and 29 are operated to initiate engagement of the engine speed clutch C1 and brake B respectively which are both hydraulically operated. Lever 32 is also movable against the action of spring loading 49, to a position G in which it engages a fork 43 of a mechanical actuating system 43, 41, 31 for the ground speed clutch C2. Movement of lever 32 from position G to position C2' moves the mechanical actuating system to engage clutch C2. Lever 32 is only movable from position C2' to positions C1' and B' via position G to ensure disengagement of the ground speed clutch C2 before initiation of the engagement of the engine speed clutch c1 or the brake B.

4 Claims, 4 Drawing Sheets

CONTROL LEVERS

This invention relates to control lever arrangements and particularly to such arrangements used to control the operation of clutches and brakes provided in power take-off drive lines of agricultural or industrial tractors.

Such drive lines may be provided with a clutch which when engaged powers the drive line directly from the engine so that the drive line output rotates at a speed directly proportional to the speed of the engine (this is a so-called engine speed PTO). In another arrangement such drive lines may be provided with a clutch which when engaged powers the drive line from the tractor transmission so that the drive line output rotates at a speed directly proportional to the forward speed of the tractor over the ground, (this is a so-called ground speed PTO).

Problems arise in providing a simple but efficient control arrangement when it is desired to provide an engine speed PTO and a ground PTO facility on the same tractor. This difficulty is compounded if a PTO brake is also included and if some of the PTO clutch or brake functions are mechanically controlled and some are not.

It is an object of the present invention to provide a simple but efficient control arrangement which is suitable for the control of engine and ground speed PTO and also a PTO brake.

Thus according to the present invention there is provided a PTO drive line control lever arrangement comprising a control lever movable to discrete first and second positions to actuate first and second actuating means to initiate engagement of a first PTO clutch and a PTO brake respectively, said lever also being movable to a third position in which it picks up an actuating system for the engagement and disengagement of a second PTO clutch, movement of said lever from said third position to a fourth position being arranged to move said actuating system to engage said second clutch and said lever only being movable from said fourth position to said first and second positions via said third position to ensure disengagement of the second clutch before actuation of the first clutch or brake.

The above control lever arrangement provides a simple but efficient means for controlling the two PTO clutches and the PTO brake in a manner which ensures that the two clutches cannot be engaged simultaneously, (which would be disastrous for PTO drive line and transmission) and the brake cannot be engaged when either clutch is engaged. The control lever arrangement also enables the first clutch (for example the engine speed PTO clutch) and the brake to be hydraulically engaged using solenoid-operated valves actuated by first and second switches located at the first and second positions, and the second clutch (for example the ground speed PTO) to be mechanically engaged. The ground speed PTO clutch may conveniently take the form of a dog clutch or sliding sleeve which is operated by a cable or other mechanical system.

In a preferred arrangement the control lever moves along a gate which has a neutral plane in which neither of the clutches nor the brake is actuated, first bias means acting on the lever to bias the lever towards a rest position in the neutral plane adjacent the third position, the lever being movable from said rest position to the third position against the action of a second bias means.

Preferably the first and second switches are located at the first and second positions respectively for the control of solenoid-operated fluid-flow control valves, said valves controlling respectively the first clutch and the brake, and a selector fork of a mechanical actuating system is provided for engagement by the lever at the third position so that the lever moves between the third and fourth positions in engagement with the fork thus engaging and disengaging the second clutch mechanically.

The present invention also provides a tractor PTO drive line with an engine speed power take-off facility, a ground speed power take-off facility and a power take-off brake controlled by a control lever arrangement of the form described above in which the first clutch forms part of the engine speed power take-off facility and the second clutch forms part of the ground speed power take-off facility.

One embodiment of the present invention will now be described by way of example only, with reference to the accompanying drawings in which.

Figure 1:
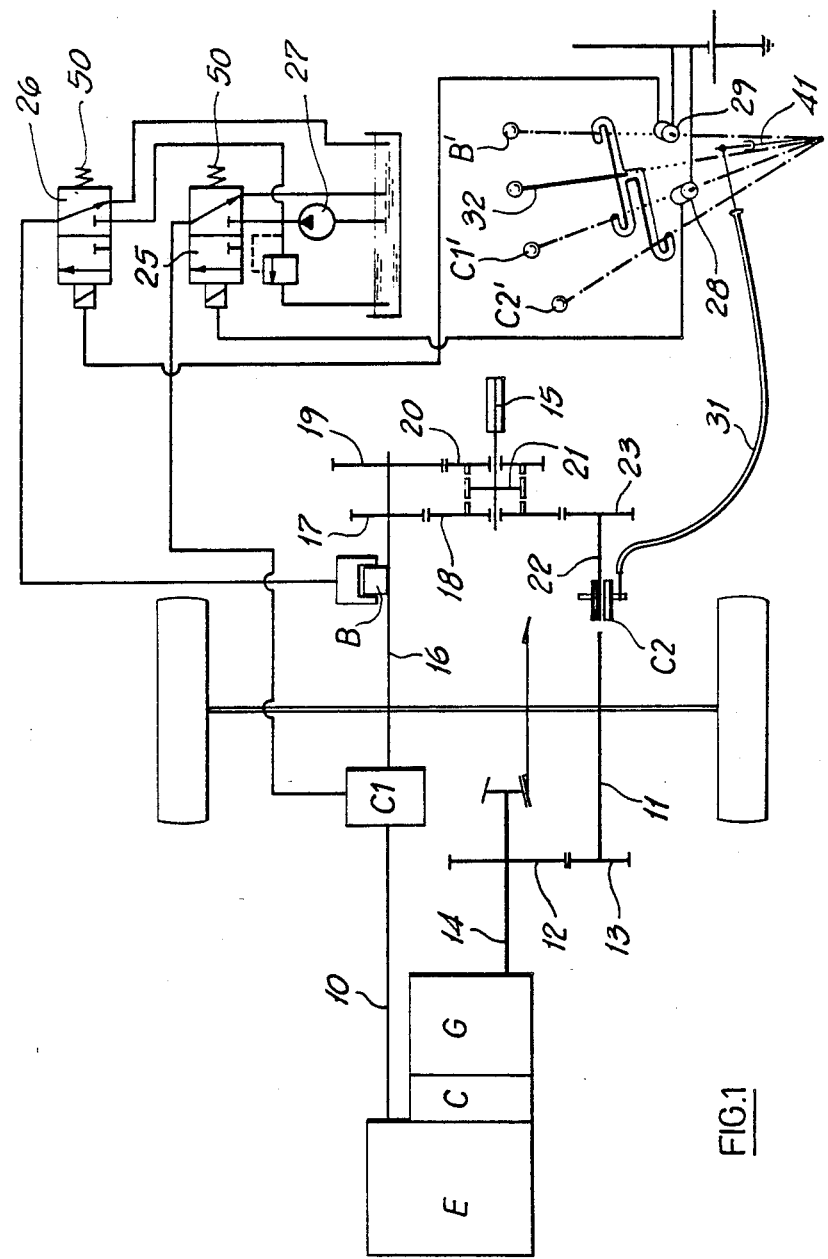
FIG. 1 is a schematic view of a tractor PTO drive line and its associated control systems which include a control lever arrangement in accordance with the present invention.

Referring to FIG. 1 this shows a tractor PTO drive line in which an engine speed PTO facility is provided via a shaft 10 which is directly driven from the engine E and a ground speed PTO facility is provided by a shaft 11 which is driven via gears 12 and 13 from the output shaft 14 of the gearbox G of the tractor which is driven from the engine E via a clutch C.

A PTO drive output shaft 15 is driven from shaft 10 via a first oil-cooled PTO clutch C1, shaft 16 and gear trains 17,18 and 19,20. A coupler 21 is provided on shaft 15. Coupler 21 is displaceable to the left as viewed in FIG. 1 (by a mechanism not shown) to connect gear 18 with shaft 15 thus driving the output shaft at 540 r.p.m. at the correct rated speed of the engine. The coupler 21 is also displaceable to the right on shaft 15 to couple gear 20 with shaft 15 thus driving the output shaft 15 at 1000 r.p.m. at the correct rated engine speed. A light brake B is also provided which prevents rotation of shaft 16 when clutch C1 is disengaged and no implement is connected with the output shaft 15. This brake may, for example, be of the form described and claimed in the Applicants co-pending UK Patent Application No. 8622844.

Output shaft 15 may alternatively be driven from shaft 11 via mechanical clutch sleeve C2, shaft 22 and gear 23 which also meshes with gear 18. As will be appreciated when sleeve C2 is displaced to the left as viewed in FIG. 1 shafts 11 and 22 are connected which ensures that the output shaft 15 is driveable at two speeds (dependent on the position of sleeve 21) both proportional to the forward speed of the tractor over the ground.

Clutch C1 and brake B are both hydraulically operated using solenoid-operated control valves 25 and 26 respectively which receive a supply of pressurized fluid from a pump 27. Valves 25 and 26 are actuated by switches 28 and 29 respectively which are controlled by a control lever arrangement 30 in accordance with the present invention. Control lever 30 also controls the clutch sleeve C2 via a mechanical linkage which includes a Bowden cable 31.

Figure 2:
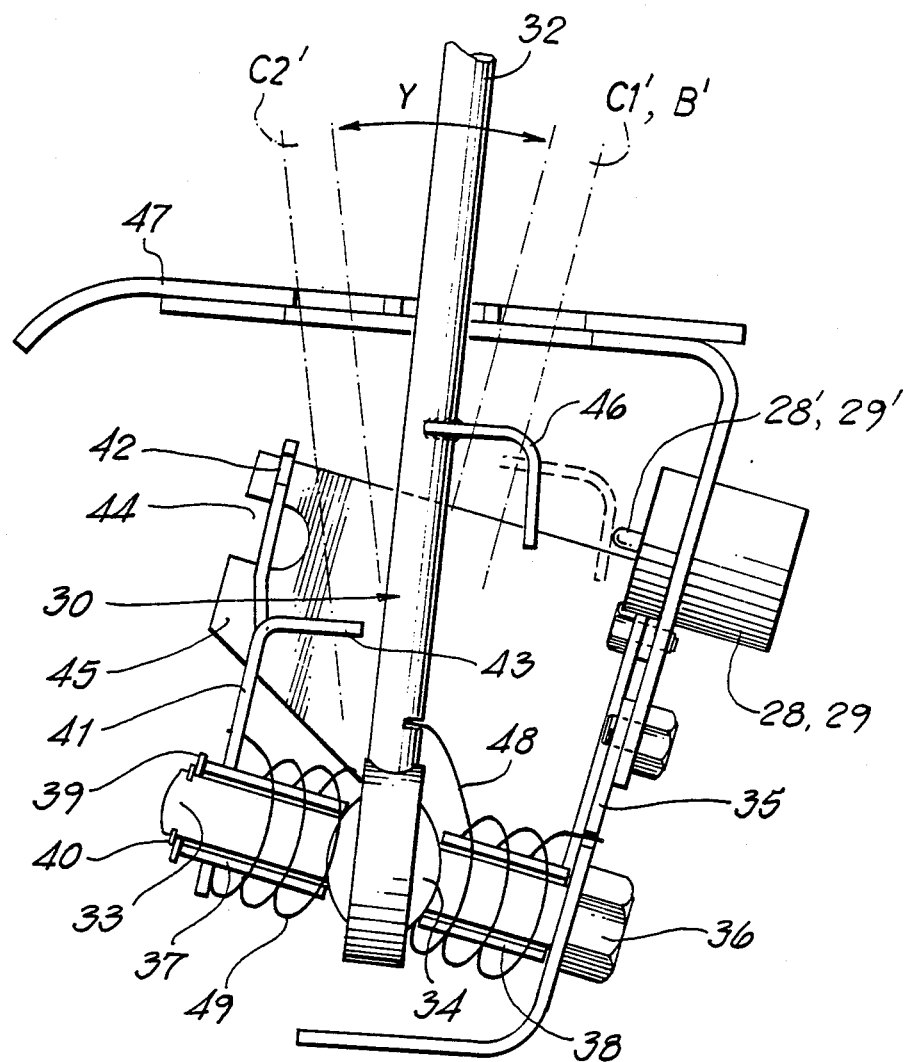
FIGS. 2 and 3 are end and side views respectively of the control lever arrangement shown schematically in FIG. 1, and FIG. 4 a diagrammatic view (not to scale) of the control gate of the control lever of FIGS. 2 and 3.
Figure 3:
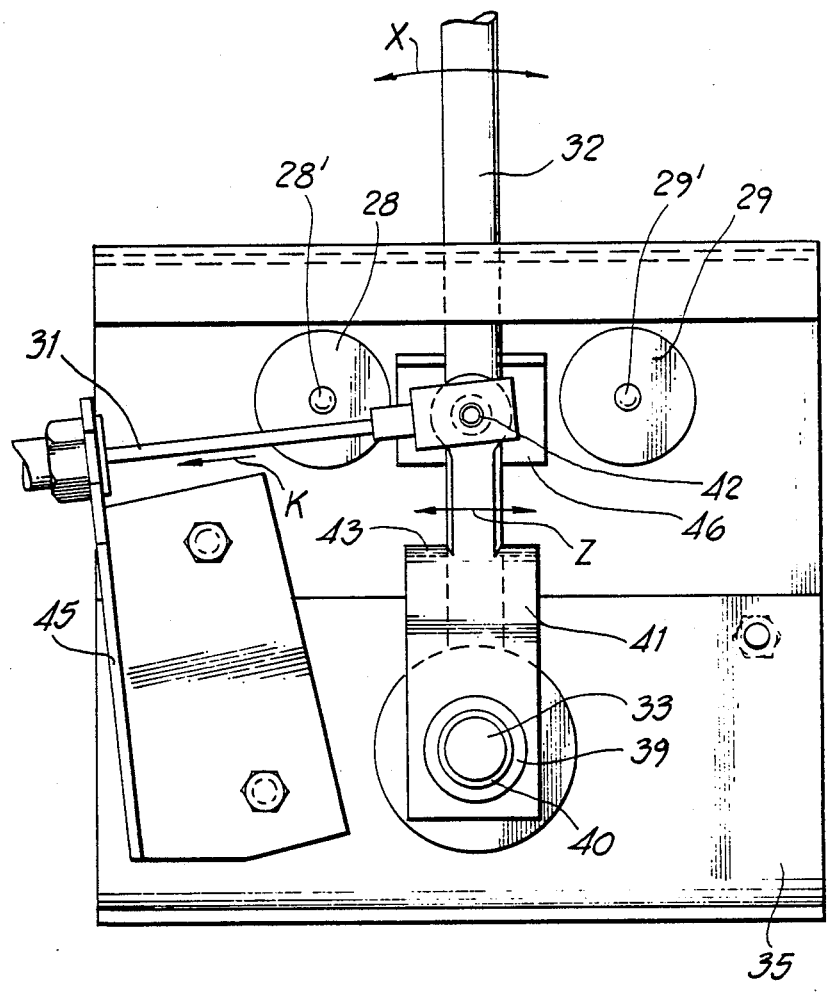
Figure 4:
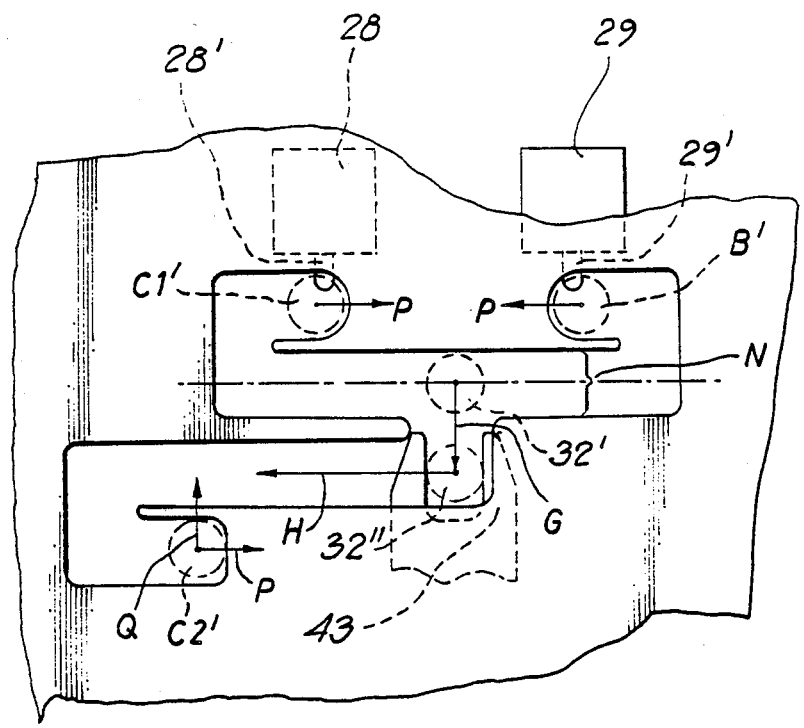

The control lever arrangement 30 is shown in greater detail in FIGS. 2, 3 and 4. Basically the control lever arrangement comprises a lever 32 which is mounted on a shaft 33 on a ball type mounting 34 which allows two degrees of freedom for pivotal movement of the lever 32 relative to shaft 33 as indicted by arrows X and Y in FIGS. 2 and 3.

Shaft 33 is held on a support structure 35 by a nut 36 and ball mounting 34 is located on shaft 33 by sleeves 37 and 38 which are held captive between the support structure 35 an a washer and circlip arrangement 39, 40. Sleeve 37 carries an arm 41 having an attachment eye 42 for the cable 31 which actuates clutch sleeve C2. Arm 41 also includes a fork formation 43 which can be engaged by lever 32 for movement of the arm 41 as indicated by the arrow Z in FIG. 3. It will be appreciated (as shown in FIG. 3) that the inner of cable 31 will be attached to eye 42 and the outer held captive in an aperture 44 in a support bracket 45 which is secured to support structure 35.

Support structure 35 also carries the two switches 28 and 29 which arranged to be actuated by a pad 46 which is welded onto lever 32.

A control gate for lever 32, which is shown in FIG. 4, is provided in a plate 47 which is secured to the top of the support structure 35. The control gate has a neutral leg N in which neither clutch C1, brake 8 nor clutch C2 is actuated. The lever 32 is movable from the neutral leg N to positions C1', B' and C2' shown in FIG. 4 to actuate the clutch C1, the brake 8 and the clutch C2 respectively.

A torsion spring 48 acts between the lever 32 and the support structure 35 so as to bias the lever 32 towards the central rest position 32' indicated in FIG. 4. Since the portions of the gate defining positions C1', C2' and B are of re-entrant form spring 48 also tends to hold the lever 32 in positions C1', C2' and B. A compression spring 49 acts between the lever 32 and the base of arm 41 so as to tend to resist movements of the lever from position 32' into position 32" of FIG. 4 when the lever engages fork 43 on arm 41.

The operation of the control lever arrangement 30 is as follows. If, for example, the lever 32 is in position 32' of FIG. 4 and the tractor operator wishes to engage the engine speed PTO clutch C1, he moves the lever along neutral leg N and then out towards position C1' in which the pad 46 on lever 32 depresses the actuating member 28' of switch 28 to close the switch and hence open valve 25 against the action of spring 50 to pressurize and thus engage clutch C1.

If the operator now wishes to disengage clutch C1 and engage the PTO brake B he moves the lever from the position C1' into the leg N along the leg and out of the leg to position B' where the actuating member 29' of switch 29 is depressed thus operating valve 26 to pressurize and disengage the brake B.

It will be appreciated that moving the lever 32 from position C1' to position B' not only engages brake B but also disengages clutch C1 by deactivating switch 28.

Similarly a movement of the lever 32 from position B' will disengage brake B.

The lever 32 is held in position C1' and B' by the centering force of spring 48 indicated diagrammatically in FIG. 4 at P.

If the operator now wishes to engage ground speed PTO he moves the lever 32 into the neutral leg N to position 32' and thence in direction G against the action of spring 49 to the position 32". In this position the lever 32 is engaged in the fork 43 and upon pivoting of the lever 32 in direction H of FIG. 4 towards the position C2' the arm 41 is moved in an anti-clockwise sense about pin 32 to move the inner of cable 31 in direction K thus moving the clutch sleeve C2 to the left as viewed in FIG. 1. It will be appreciated that lever 32 is held in the position C2' by the centering force P of spring 48 and the bias force Q of spring 49.

From the above it will be evident that the present invention provides a control lever arrangement which is particularly suited to the control of an engine speed PTO clutch and a ground speed PTO clutch and also the operation of an associated PTO brake. The control arrangement enables all the above three functions to be easily controlled by a single lever and ensures that only one of these three functions can be operated at any given instant.

I claim:

1. A power take-off drive line control lever arrangement comprising a control lever movable to discrete first and second positions to actuate first and second switches respectively to initiate engagement of a first power take-off clutch and a power take-off brake respectively via solenoid-operated fluid-flow control valves, said lever also being movable to a third position in which it picks up a selector fork of a mechanical actuating system for the engagement and disengagement of a second power take-off clutch, movement of said lever from said third position to a fourth position being arranged to move said fork to engage said second clutch mechanically and said lever only being movable from said fourth position to said first and second positions via said third position to ensure disengagement of the second clutch before actuation of the first clutch or brake.

2. A control lever arrangement according to claim 1 in which the control lever moves along a gate which has a neutral plane in which neither of the clutches nor the brake is actuated, first bias means acting on the lever to bias the lever towards a rest position in the neutral plane adjacent the third position, the lever being movable form said rest position to the third position against the action of a second bias means.

3. A control lever according to claim 2 in which portions of the gate defining the first, second and fourth positions are re-entrant in form so that the lever is held in its first, second and fourth positions by the first bias means.

4. A Tractor power take-off drive line with an engine speed power take-off facility, a ground speed power take-off facility and a power take-off brake controlled by a control lever according to claim 1 in which the first clutch forms part of the engine speed power take-off facility and the second clutch forms part of the ground speed power take-off facility.

* * * * *